Patented Aug. 24, 1943

2,327,472

UNITED STATES PATENT OFFICE 2,327,472

PHTHALOCYANINE PIGMENT AND METHOD OF PREPARING SAME

Vincent C. Vesce, Ridgewood, and Ferdinand M. Stalzer, Haledon, N. J., assignors to Harmon Color Works, Inc., Haledon, N. J., a corporation of New York No Drawing. Application January 3, 1941, Serial No. 373,054

13 Claims. (Cl. 106—288)

This invention or discovery relates to phthalocyanine pigments and methods of preparing same; and it comprises pigments of the phthalocyanine type capable of remaining dispersed in organic vehicles and of retaining a true color tone in coating films produced therefrom and having aluminum benzoate precipitated thereon; it also comprises methods of producing such pigments as well as a method of drying wet finely divided phthalocyanine pigments without coarsening the particles wherein aluminum benzoate is produced in the wet material and the product is thereafter dried; all as more fully hereinafter set forth and as claimed.

Phthalocyanines offer interesting and important possibilities as pigments and pigment toners for lacquers, paints, varnishes, enamels, inks, etc.; because of their brilliance and intensity of color and their permanence. Much work has been done along this line, both in this country and abroad. The practical difficulties lie in converting phthalocyanines, which are generally produced as hard crystalline bodies, into a dry pigment fulfilling commercial requirements, that is, one which is very fine, soft and is readily dispersed as a permanent suspension in the usual paint, varnish, enamel, etc., vehicles.

Many phthalocyanines have been produced and these are characterized by brilliant colors and great permanence. Most of the work, however, has been done on copper phthalocyanine which has a vivid true blue color and is highly desirable for printing inks and for tinting lacquers and varnishes.

It has not proved practicable to produce copper phthalocyanine as a pigment of this character by direct grinding of the hard crystalline reaction products. They are generally made by an expedient; by dissolving the phthalocyanine in concentrated sulfuric acid and diluting to produce a fine precipitate. The wet precipitate is converted into a wet paste. In the washed wet paste the individual particles are of very great fineness and it is a technical problem to retain this fineness in dry commercial pigment. It is done but with difficulty. A phthalocyanine pigment, as a dry powder, must diffuse uniformly and completely in a clear varnish vehicle to give a coating film in which there is a high degree of separation of particles and aggregates and relative uniformity of their distribution in a wet or dry film. It is not only necessary to make a uniform dispersion of the pigment particles, but that they should retain this uniformity without segregation, flocculation or crystallization. The pigmented film should be uniform without segregations or mottling. In the small quantity necessary to give color the dried film should be transparent.

Most of the commercial work, as stated, has been done with copper phthalocyanine, though much also has been done on the metal-free phthalocyanine. The copper phthalocyanine is a substance of deep blue hue in mass. There are various dry copper phthalocyanine preparations of differing merit on the market made from the wet paste obtained after precipitation. Three of them are on the market under the trade names "Heliogen Blue BV," "Monastral Blue BSN," "Monastral Blue BSND." Some of these preparations grind easier than others into vehicles and compositions such as are used in making enamels, paints, lacquers, inks, etc. With all of them, and even with the finest and softest powders, on dispersion in a vehicle or at a later stage (during the drying of the film) there is a progressive flocculation or development of a sort of curdling. Flocculation can be defined as a grouping of individual particles, or of small aggregates of particles, which have been wet by the vehicle as separate units. In flocculation clusters or groups separate from the vehicle and leave a pattern of non-uniformity when the varnish is dried down. Sometimes crystals are formed, visible under the microscope. Flocculation in a coating composition affects the gloss, smoothness and the color value. These difficulties are especially pronounced in the presence of an extending opaque white.

Some such flocculation or crystallization or coarsening generally takes place in attempting to dry the wet paste. By special precautions in the operation the wet paste can be dried to a soft powder of pigmentary fineness; but it is difficult.

We have discovered that a treatment of commercial phthalocyanines, not only the copper phthalocyanine ("Monastral" Blue) but other phthalocyanines with a substantial amount of aluminum benzoate added to the wet paste in molecular contact gives a compound pigment which does not coarsen in suspension and in drying; which retains its original color value. The amount of aluminum benzoate used is substantial, being at least 30 per cent of the total weight. This amount will vary depending on the particular quality or fineness of the phthalocyanine pigment to be treated. Physical mixtures of dry aluminum benzoate and dry phthalocyanine are not so effective. In starting with the dry pigment and the aluminum benzoate in a separate preparation it is better to ball mill them wet. The best results are however obtained by direct precipitation of aluminum benzoate on the phthalocyanine. The net effect of this improvement is to stabilize the fineness of the original pigment, against flocculation or coagulation before or after application to a surface as a coating film.

In view of the stated difficulties in drying phthalocyanine wet pastes, it is best to effect the precipitation in the wet mix before drying. The invention then becomes also an improvement in drying methods. After association with aluminum benzoate there is less difficulty about drying. To the wet color paste, under suitably controlled conditions, is added a solution of an aluminum salt, which may be the sulfate, and reaction is effected by the addition of a solution of a benzoate; usually sodium benzoate. This forms aluminum benzoate in molecular association with the phthalocyanine. Equal parts of aluminum benzoate and phthalocyanine give a good product. Less than 30 per cent of the total, of aluminum benzoate does not work so well and more than about 70 per cent is not usually worth while. In other words the foregoing proportions include the preferred optimum range using phthalocyanine of usual characteristics. As stated, the illustrative proportion of about 30 per cent aluminum benzoate may be varied, depending on various factors such as the particular quality or degree of fineness of the pigment, and the ultimate product desired. Thus it will be appreciated that the deflocculating effect of the aluminum benzoate is apparent though not usually in optimum degree in compositions having less than 30 per cent aluminum benzoate, provided, of course, that a substantial proportion is present. The proportions of sodium benzoate and aluminum sulfate employed are such as correspond stoichiometrically to Al(BZ)$_3$.

After washing, the treated phthalocyanine can be dried in any of the ordinary ways without fear of coarsening or crystallization. It may be converted into a fine dispersion in any of the ordinary paint and varnish vehicles, retaining its fineness of particle. The washed, treated wet phthalocyanine presscake can also be "flushed" into organic vehicles to produce smooth oil pastes well dispersed, with fine particle subdivision and without flocculating tendencies. The present so-called "flushed" phthalocyanine pastes will all flocculate when reduced with organic vehicles to produce paints, lacquers, enamels, etc., whereas if one starts with the paste secured from our new pigment, a good dispersion results.

Other methods of producing aluminum benzoate in situ than the reaction between an aluminum salt and a benzoate are possible. Alumina may be deposited on the phthalocyanine by precipitation from an alumina salt with alkali. After washing the precipitate it may be treated with benzoic acid. In so doing an excess of alumina may be used. It forms a good substrate. Another method of producing a good product is to ball mill a mixture of the ordinary wet or dry copper phthalocyanine blue with dry or wet aluminum benzoate in the presence of water. This ball milling produces pretty good results, but in the best embodiments we precipitate aluminum benzoate as described.

The reason for the described actions on the phthalocyanine are not apparent. They are probably due to some sort of molecular union of the benzoate and the phthalocyanine; something like the unions which occur in mordanting.

*Example 1.*—In an example illustrative of one good procedure for obtaining the new composite pigment, 50 parts (dry weight basis) of a washed moist copper phthalocyanine blue presscake were slurried with sufficient water, 950 parts, to make a 5 per cent suspension. The pH was brought to neutrality and there were added 74 parts (by weight) of sodium benzoate as a 5 per cent aqueous solution. To the mixture were added with thorough stirring 60 parts of aluminum sulfate as a 5 per cent aqueous solution. The slurry was stirred for a while, then filtered, washed and dried in the ordinary way. The yield was 100 parts, dry weight, of a copper phthalocyanine-aluminum-benzoate lake, of which the copper phthalocyanine accounted for 50 parts and the aluminum benzoate 50 parts. The pigment was insoluble in water. The pH of the slurry after the precipitation was 3.4.

The pigment disperses readily in organic vehicles to yield water-clear films on drying; films of trule blue hue and of great permanence. As stated, in a clear varnish with merely enough of the preparation to give a good blue, the film dries clear and transparent; there is no cloudiness or mottling due to flocculation.

In some cases the slurry, after the precipitation of the aluminum benzoate, is brought to 7.0 pH (neutrality) with soda ash prior to filtering. Similar results are secured. Also good results are obtained by working with pigment slurries of higher concentrations and employing reagent solutions of higher concentration, as in the following example:

*Example 2.*—1,000 parts of a washed copper phthalocyanine blue smooth paste containing 10 percent of pigment (dry weight) were stirred and 148 parts sodium benzoate dissolved in 1,480 parts water added. To the stirred mixture was added 120 parts aluminum sulphate dissolved in 1,000 parts water. The slurry was stirred for a suitable length of time, filtered, washed and dried in the ordinary way. The yield equalled 200 parts, dry weight, of a copper-phthalocyanine-aluminum-benzoate lake, of which the copper phthalocyanine accounted for 100 parts and the aluminum benzoate 100 parts.

*Example 3.*—In another example a similar amount of presscake was treated for precipitation of aluminum benzoate therein exactly as in Example 1, but instead of drying the composite pigment in the ordinary way, there was added to the slurry an emulsion of 25 parts of a commercial volatile petroleum fraction of narrow boiling point range ("Apco Thinner") containing 2.5 parts of a commercial surface active agent such as "Aerosol OT," in 100 parts water. The emulsion was added gradually to the pigment slurry, with constant stirring, which was continued after all the emulsion was incorporated, until such time as the emulsion broke due to the acidity (pH—4) of the suspension. The slurry was then filtered, washed and dried in pans in an oven. An even finer and softer pigment, but of the same composition as in Example 1, was produced. In drying the water was vaporized first.

*Example 4.*—100 parts of dry copper phthalocyanine pigment (of a quality soft in texture but which flocculates if used in organic vehicles) was placed in a ball mill together with 100 parts of dry aluminum benzoate and 800 parts water. This mixture was subjected to the action of steel or porcelain balls for some time, say about 16 hours. Then the mill was opened, and the mixture dried out, yielding a pigment of good dispersing properties.

*Example 5.*—Another method of producing a good dispersing type of "Monastral" blue pigment is to start with the water dispersible type copper phthalocyanines similar to that shown in Patent No. 2,213,693. By starting with these water dispersed types one dissolves (disperses) in water the equivalent of say 50 parts (dry weight basis) of phthalocyanine pigment and then to precipitate the aluminum benzoate directly thereon. A good dispersible pigment is thus obtained.

If desired, the presscake of the copper phthalocyanine-aluminum-benzoate lake can be treated in a Werner-Pfleiderer mixer or any other suitable apparatus with organic vehicles, etc., and the mixture subjected to stirring or kneading actions. An immediate separation of water takes place in which the pigment transfers itself to the oil, and by applying vacuum to eliminate the remaining traces of water, one secures a highly dispersed smooth paste comprising the pigment mentioned above with the organic vehicle in intimate contact. In "flushing" the wet paste the aqueous continuous phase is replaced by a non-aqueous continuous phase; see Patent 2,192,954.

In all these examples metal-free phthalocyanine can be substituted for copper phthalocyanine with correspondingly good results. It is also possible to treat phthalocyanines containing metals other than copper as well as the chlorinated phthalocyanines.

If desired the aluminum benzoate can be precipitated in situ with aluminum hydrate by employing soda ash in conjunction with the sodium benzoate so that on addition of the aluminum sulfate there are formed both aluminum benzoate and aluminum hydrate. This modification is advantageous even though aluminum hydrate by itself does not improve the dispersibility of the phthalocyanine pigment. It is, however, as stated, a good substrate. Similar considerations apply to other bases, such as aluminum silicate, barium resinate, calcium resinate, and others. These do not prevent the flocculation phenomena noted, but they can be employed in conjunction with aluminum benzoate which does.

There are several good tests for comparing the dispersibility of the composite pigment of the invention with that of other pigments. One is as follows: 5 or 10 parts of the pigment are mixed with 100 parts of a 50 per cent low viscosity alkyd resin solution. A suitable quantity of the mixture is run over a roller mill 6 or 7 times and the composition is then further diluted with solvents so that its viscosity corresponds to 20 seconds at 80° F. using Ford Cup No. 4. A suitable solvent to use is mineral spirits, alone or mixed with an equal weight of dipentine; another is a proprietary mineral spirit preparation, Solvesso No. 3. The thinned composition thus obtained is then poured as a film over a glass slide and observed immediately and during the evaporation of the solvent. If the pigment is not suitably dispersed, a stratification or reticulation of the film occurs, readily visible to the naked eye, and even more marked under magnification of a microscope. If dispersion is good, the film dries with good gloss and high clarity or transparency, no flocculation being observed. The pure hue of the original pigment in mass is preserved.

Another example for determining the dispersibility of the pigment desired in the invention and making comparisons with that of different other phthalocyanines is as follows:

Five grams of the pigment are ground on a roller mill together with 22.5 grams titanium dioxide white, 22.5 grams antimony oxide white, and 50 grams of castor oil No. 4. This mixture is run over the roller mill about 6 times and then after mixing, this paste is ready to be made up into lacquer, which is accomplished as follows: 20 grams of the paste described above are added to 100 grams of thinned clear lacquer solution. This is mixed and poured over a glass slide and allowed to dry as a film. Then a drop of lacquer solvent is applied to the film and allowed to evaporate. A well dispersed blue will leave a ring (where evaporation of solvent occurred) substantially the same color as the rest of the color slide, whereas with a flocculating blue it will be easy to see that the spot where the drop was applied will have turned off color (with a whitish outer ring) indicating poor dispersion. The thin clear lacquer used above was prepared by mixing 1500 grams nitrocellulose solution (28 per cent solids) with 80 grams of Beckasol resin solution No. 1323 and 2220 grams lacquer solvents consisting of 40 per cent ethyl acetate by volume, 40 per cent butyl acetate and 20 per cent butanol. This produces 3800 grams of a clear lacquer unplasticized ready for the test.

What we claim is:

1. A pigment of the phthalocyanine type capable of remaining in uniform dispersion in suspension in organic paint, varnish and lacquer vehicles and of yielding smooth films of true hue in coating films, comprising a phthalocyanine pigment having aluminum benzoate intimately incorporated therewith in the wet state, in such proportion with respect to the phthalocyanine pigment as to prevent any substantial appearance of flocculation with degradation of color, in coating films containing the pigment.

2. A pigment of the phthalocyanine type capable of remaining in uniform dispersion in suspension in organic paint, varnish and lacquer vehicles and of yielding smooth films of true hue in coating films, consisting of a phthalocyanine pigment having aluminum benzoate precipitated thereon in amount sufficient to prevent any substantial appearance of flocculation or degradation of color in coating films containing the pigment.

3. The pigment of claim 1 wherein the pigment consists of equal parts of phthalocyanine pigment and aluminum benzoate.

4. The pigment of claim 1 wherein the phthalocyanine pigment is copper phthalocyanine.

5. The pigment of claim 1 wherein the phthalocyanine pigment is metal-free phthalocyanine.

6. The pigment of claim 1 wherein the phthalocyanine pigment is of water-dispersible type.

7. In drying wet phthalocyanine paste containing the color in fine suspension without coarsening of particle size, the process which comprises producing aluminum benzoate in the wet mixture and then drying; the amount of aluminum benzoate so incorporated in the phthalocyanine being sufficient to prevent any substantial flocculation or degradation of color in coating films containing the pigment.

8. A method of making improved dry fine-textured phthalocyanine pigments wherein aluminum benzoate is intimately incorporated with a phthalocyanine pigment in aqueous suspension and the mixture is then dried; the amount of aluminum benzoate so incorporated in the phthalocyanine being sufficient to prevent any substantial flocculation or degradation of color in coating films containing the pigment.

9. A method of making improved phthalocyanine pigments wherein a phthalocyanine pigment is admixed in aqueous suspension with reagents adapted to produce aluminum benzoate on mutual reaction and the pigment with the incorporated aluminum benzoate is freed of water; the amount of aluminum benzoate so incorporated in the phthalocyanine being sufficient to prevent any substantial flocculation or degradation of color in coating films containing the pigment.

10. The method of claim 8 wherein the reagents are sodium benzoate and aluminum sulfate.

11. The method of claim 8 wherein the reagents are sodium benzoate and aluminum sulfate and soda ash whereby hydrated alumina is produced in addition to the aluminum benzoate.

12. The pigment of claim 1 wherein the pigment comprises between 30 and 70 per cent of aluminum benzoate with respect to the phthalocyanine pigment.

13. A pigment of the phthalocyanine type capable of remaining in uniform dispersion in suspension in organic paint, varnish and lacquer vehicles and yielding smooth films of true hue in coating films comprising a phthalocyanine pigment having above approximately 30 per cent of an aluminum benzoate intimately incorporated therewith and resulting from an association of the materials in the wet state.

VINCENT C. VESCE.
FERDINAND M. STALZER.